US009241148B2

(12) United States Patent
Liu et al.

(10) Patent No.: US 9,241,148 B2
(45) Date of Patent: Jan. 19, 2016

(54) DISPARITY CALCULATING METHOD AND STEREO MATCHING DEVICE THEREOF

(71) Applicant: NOVATEK Microelectronics Corp., Hsin-Chu (TW)

(72) Inventors: Guangzhi Liu, Shanghai (CN); Lei Zhou, Shanghai (CN); Cheng-Wei Chou, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 73 days.

(21) Appl. No.: 14/100,003

(22) Filed: Dec. 8, 2013

(65) Prior Publication Data
US 2015/0063680 A1  Mar. 5, 2015

(30) Foreign Application Priority Data

Sep. 2, 2013 (CN) .......................... 2013 1 0393454

(51) Int. Cl.
*G06K 9/00* (2006.01)
*H04N 13/00* (2006.01)
*G06T 7/00* (2006.01)

(52) U.S. Cl.
CPC .......... *H04N 13/0022* (2013.01); *G06T 7/0075* (2013.01); *G06T 2207/10012* (2013.01); *H04N 2013/0081* (2013.01)

(58) Field of Classification Search
CPC .............. H04N 13/00; H04N 13/0022; H04N 2013/0081; H04N 13/0239; G06T 7/0075; G06T 5/002; G06T 5/00; G06T 7/00; G06T 7/0022; G06T 2207/10012; G06T 7/0065; G06T 7/002
USPC .......... 382/100, 154, 162; 348/51, 42, 43, 47, 348/218.1, E13.014, E13.062, E13.071, 348/E13.004, E13.03, E13.027, E13.072, 348/E13.038, E13.04, E13.043, E13.058, 348/E13.059, E13.015, E13.016, E13.019, 348/E13.025, E13.033, E13.037, E13.069, 348/E13.073, E13.022, E13.064, E13.065, 348/E13.001, E13.008, E13.02, E13.067, 348/E13.017, E5.108, E13.061, E13.07; 345/32, 54, 426, 419, 592, 629, 599, 345/617, 597
See application file for complete search history.

(56) References Cited

U.S. PATENT DOCUMENTS 7,769,205 B2 *  8/2010  Arias-Estrada et al. ...... 382/106
8,538,159 B2 *  9/2013  Lu ................................. 382/195

(Continued)

FOREIGN PATENT DOCUMENTS

TW  201322732  6/2013
TW  201325202  6/2013

*Primary Examiner* — Sheela C Chawan
(74) *Attorney, Agent, or Firm* — Winston Hsu; Scott Margo

(57) ABSTRACT

A disparity calculating method includes generating an energy matrix according to a first image-block and a second image-block, wherein the energy matrix includes a plurality of energies of a plurality of pixels corresponding to a plurality of disparity candidates; setting the energy corresponding to a starting pixel of the plurality of pixels and a specified disparity candidate of the plurality of disparity candidates as a first predetermined value and setting the energies corresponding to the starting pixel and other disparity candidates of the plurality of disparity candidates as a second predetermined value, wherein the second predetermined value is greater than the first predetermined value; generating a path matrix according to the energy matrix; and determining a plurality of disparities of the plurality of pixels sequentially from an ending pixels of the plurality of pixels, wherein the disparity of the ending pixel is set as a third predetermined value.

16 Claims, 3 Drawing Sheets

(56) References Cited

U.S. PATENT DOCUMENTS

| | | | |
|---|---|---|---|
| 8,588,515 B2 * | 11/2013 | Bang et al. | 382/154 |
| 8,855,408 B2 * | 10/2014 | Kim et al. | 382/154 |
| 8,929,645 B2 * | 1/2015 | Coffman | 382/154 |
| 2010/0188584 A1 | 7/2010 | Liu | |

* cited by examiner

DISPARITY CALCULATING METHOD AND STEREO MATCHING DEVICE THEREOF

BACKGROUND OF THE INVENTION

1. Field of the Invention

The present invention relates to a disparity calculating method and stereo matching device thereof, and more particularly, to a disparity calculating method capable of smoothing the disparity information of the fringe area of the frame and stereo matching device thereof.

2. Description of the Prior Art

With continuously progressing image technologies, sizes and functionalities of display devices are increasingly diverse. In order to meet requirements of the different consumers, manufacturers of the display devices try to provide new products with better outputting performance and resolution. One of the most interesting products is a display device with three-dimensional display functionality. General three-dimensional display technologies include polarized, interlaced or anaglyph display methods. These display methods utilize special optical structures to project images with different views corresponding to depth information on human left and right eyes. Thus, the human left and right eyes may respectively capture the images with different views to be synthesized by the human brain, and the human may sense a three-dimensional image.

When two-dimensional images without the depth information are displayed by the display device having the three-dimensional display functionality, since the source images for displaying lack the depth information, the display device may not generate multi-views images corresponding to the depth information to be projected on the human left and right eyes. Under such a condition, the display device is required to analyze the two-dimensional images to obtain the depth information, so as to display the multi-views images. In the prior art, at least two images with different views are required to be obtained first by utilizing multiple image capture devices located in different locations, and the depth information may be analyzed from the at least two images with different views. A process for analyzing two images with different views to obtain the depth information is called stereo matching. In the stereo matching, matching objects (or characteristics, pixels, etc.) are searched for first between the two images with different views to obtain positional differences of the matching objects in the two images with different views. The positional differences are disparity information (or can be called a disparity map) of the two images, and the depth information of the matching objects may be calculated by the disparity information.

However, when the stereo matching is performed between the two images with different views for obtaining the depth information, since landscapes of the two images are not entirely the same and the two images with different views may be captured by the two image capture devices with different distances from each other, searching for the matching objects between the two images with different views to obtain the accurate disparity information may affect accuracy of the depth information. Due to occlusion effect, there are objects that cannot be matched in the images with two different views, resulting in errors when estimating the disparities. For example, the pixels of the fringe area in an image (e.g. the left fringe and the right fringe of the image) do not have corresponding pixels in another image with another view, generally, resulting in that the disparity information of the fringe area in the image has greater errors and deviations. Thus, how to reduce the errors and deviations of the disparity information of the fringe area in the image when performing stereo matching between images of two views becomes a topic to be discussed.

SUMMARY OF THE INVENTION

In order to solve the above problems, the present invention provides a disparity calculating method capable of smoothing the disparity information of the fringe area of the image and stereo matching device thereof.

As an aspect, a disparity calculating method in a stereo-matching device, used for calculating a plurality of disparities between a plurality of pixels of a first image-block and of a second image-block in a current frame is disclosed. The disparity calculating method comprises generating an energy matrix according to the first image-block and the second image-block, wherein the energy matrix comprises a plurality of energies of a plurality of pixels corresponding to a plurality of disparity candidates; setting the energy corresponding to a starting pixel of the plurality of pixels and a specified disparity candidate of the plurality of disparity candidates as a first predetermined value and setting the energies corresponding to the starting pixel and remaining disparity candidates of the plurality of disparity candidates as a second predetermined value, wherein the second predetermined value is greater than the first predetermined value; generating a path matrix according to the energy matrix; and determining the plurality of disparities of the plurality of pixels sequentially from an ending pixels of the plurality of pixels, wherein the disparity of the ending pixel is set as a third predetermined value.

As another aspect, a stereo matching device is disclosed. The stereo matching device comprises a computing unit; and a storage unit, for storing a program code used for instructing the computing unit to perform the following steps: generating an energy matrix according to a first image-block and a second image-block in a current frame, wherein the energy matrix comprises a plurality of energies of a plurality of pixels corresponding to a plurality of disparity candidates; setting the energy corresponding to a starting pixel of the plurality of pixels and a specified disparity candidate of the plurality of disparity candidates as a first predetermined value and setting the energies corresponding to the starting pixel and remaining disparity candidates of the plurality of disparity candidates as a second predetermined value, wherein the second predetermined value is greater than the first predetermined value; generating a path matrix according to the energy matrix; and determining a plurality of disparities of the plurality of pixels sequentially from an ending pixels of the plurality of pixels, wherein the disparity of the ending pixel is set as a third predetermined value.

These and other objectives of the present invention will no doubt become obvious to those of ordinary skill in the art after reading the following detailed description of the preferred embodiment that is illustrated in the various figures and drawings.

DETAILED DESCRIPTION

In embodiments of the present invention, a stereo matching device smoothes the disparity information of the fringe area via setting an energy of a start pixel in a scan line corresponding to a specific disparity candidate to a minimum value and setting a disparity of an end pixel of the scan line to a constant value when calculating the disparity information of two images with different views (e.g. images for left eye and right eye). The present invention is particularly shown and described with respect to at least one exemplary embodiment accompanied with drawings. Words utilized for describing connection between two components such as couple and connect should not be taken as limiting a connection between the two components to be directly coupling or indirectly coupling.

Figure 1:
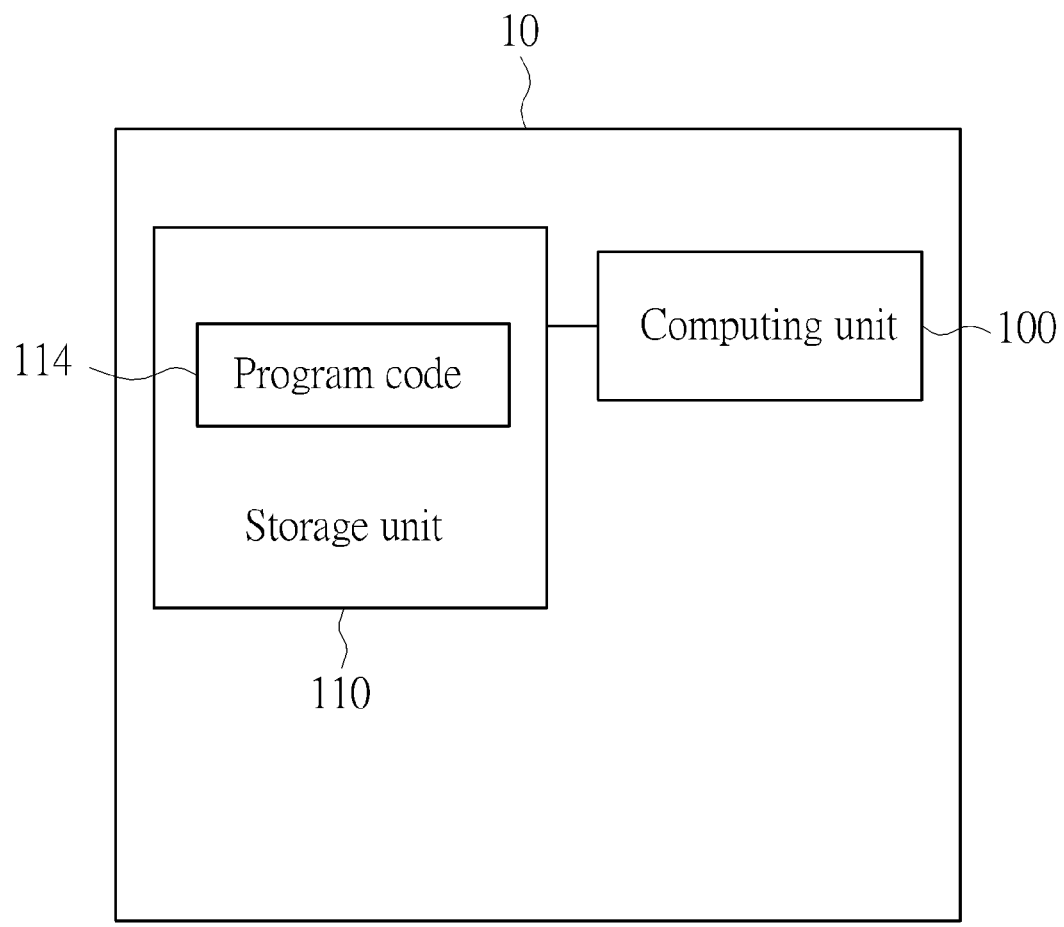
FIG. 1 is a schematic diagram of a stereo matching device according to an embodiment of the present invention.

Please refer to FIG. 1, which is a schematic diagram of a stereo matching device 10 according to an example of the present invention. The stereo matching device 10 is utilized for calculating disparity information of a current frame CF. The stereo matching device 10 includes a computing unit 100 such as a microprocessor or an Application Specific Integrated Circuit (ASIC) and a storage unit 110. The storage unit 110 may be any data storage device that can store a program code 114, accessed by the computing unit 100. Examples of the storage unit 110 include, but are not limited to, a subscriber identity module (SIM), read-only memory (ROM), flash memory, random-access memory (RAM), CD-ROM/DVD-ROM, magnetic tape, hard disk, and an optical data storage device.

Figure 2:
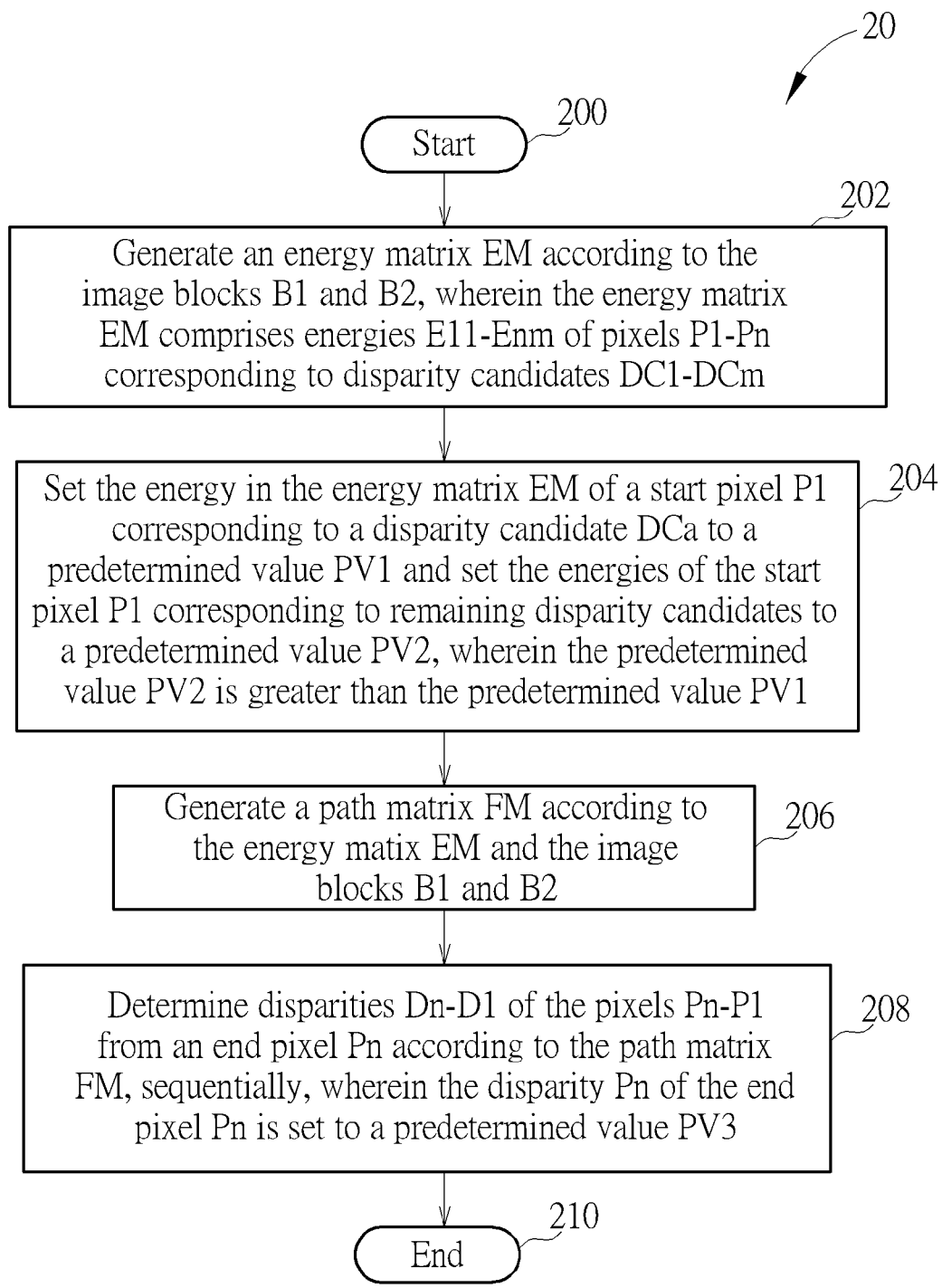
FIG. 2 is a flow chart of a disparity calculating method according to an embodiment of the present invention.

Please refer to FIG. 2, which is a flow chart of a disparity calculating method 20 according to an example of the present invention. The disparity calculating method 20 is utilized in the stereo matching device 10 for calculating the disparity information between an image block B1 of a left-eye image IL in the current frame CF and an image block B2 of a right-eye image IR in the current frame CF, wherein the image blocks B1 and B2 are scan lines located at the same row in the left-eye image IL and the right-eye image IR, respectively. The disparity calculating method 20 can be compiled to the program code 114 and comprise the following steps:

Step 200: Start.

Step 202: Generate an energy matrix EM according to the image blocks B1 and B2, wherein the energy matrix EM comprises energies E11-Enm of pixels P1-Pn corresponding to disparity candidates DC1-DCm.

Step 204: Set the energy in the energy matrix EM of a start pixel P1 corresponding to a disparity candidate DCa to a predetermined value PV1 and set the energies of the start pixel P1 corresponding to remaining disparity candidates to a predetermined value PV2, wherein the predetermined value PV2 is greater than the predetermined value PV1.

Step 206: Generate a path matrix FM according to the energy matix EM and the image blocks B1 and B2.

Step 208: Determine disparities Dn-D1 of the pixels Pn-P1 from an end pixel Pn according to the path matrix FM, sequentially, wherein the disparity Pn of the end pixel Pn is set to a predetermined value PV3.

Step 210: End.

According to the disparity calculating method 20, the energy of the start pixel P1 corresponding to the disparity candidate DCa is set to the predetermined value PV1 and the energy of the start pixel P1 corresponding to the remaining disparity candidates is set to the predetermined value PV2, wherein the predetermined value PV1 is smaller than the predetermined value PV2. For example, the predetermined value PV1 may be 0 and the predetermined value PV2 may be infinity. Preferably, the predetermined value PV2 should be much greater than the predetermined value PV1 for ensuring that the disparity candidate DCa corresponding to the predetermined value PV1 becomes the disparity D1 of the start pixel P1. Next, when sequentially determining the disparities Dn-D1 of the pixels Pn-P1 from the end pixel Pn according to the path matrix FM, the disparity Dn of the end pixel Pn is set to the predetermined value PV3. In such a condition, the stereo matching device 10 is enforced to determine the disparities Dn-1-D1 from the predetermined value PV3, sequentially. Moreover, since the energy of the start pixel P1 corresponding to the disparity candidate DCa is the minimum value among those of the start pixel P1 corresponding to the disparity candidates DC1-DCm, it converges to the disparity candidate DCa when determining the disparities Dn-1-D1 (i.e. the disparity D1 of the start pixel P1 is the disparity candidate DCa). As a result, the disparity information located at fringe area in the current frame CF is smoothed via setting the disparity candidate DCa and the predetermined values PV1-PV3 appropriately.

In detail, the disparity calculating method 20 calculates the disparity information between the image block B1 of the left-image IL and the image block B2 of the right-eye image IR of the current frame CF via a Dynamic Programming algorithm, wherein the image blocks B1 and B2 are the scan lines located at the same row in the left-eye image IL and the right-eye image IR respectively. First, the stereo matching device 10 calculates the energy matrix EM according to the image blocks B1 and B2. The formula of the stereo matching device 10 calculates the accumulation energy of the pixel located at the column x (i.e. pixel Px) corresponding to the disparity candidate dc can be expressed as:

$$EM(x,dc)=\min(EM(x-1,dc)+O,EM(x,dc-1)+O,EM(x-1,dc+1)+C(x,dc)) \quad (1)$$

Wherein E is the accumulation energy representing the accumulation cost of the pixel corresponding to the disparity candidate dc, O is the occlusion cost, and C is the matching cost of the corresponding matching point. Via the formula (1), the stereo matching device 10 can acquire the energy matrix EM. Please note that, the stereo matching device 10 sets the energy of the start pixel P1 corresponding to the disparity candidate DCa to the predetermined value PV1 and set the energies of the start pixel P1 corresponding to the remaining disparity candidates to the predetermined value PV2 (steps 202 and 204). Further, the stereo matching device 10 calculates the path matrix FM according to the image blocks B1 and B2 and the energy matrix EM. The formula of the stereo matching device 10 calculates the path matrix FM can be expressed as:

$$FM(x, dc) = \text{Im in}(EM(x-1, dc) + O, EM(x, dc-1) + O, EM(x-1, dc+1) + C(x, dc)) \quad (2)$$

$$\text{Im in}(a, b, c) = \begin{cases} 0, & a \text{ is minimum} \\ -1, & b \text{ is minimum} \\ 1, & c \text{ is minimum} \end{cases} \quad (3)$$

Similarly, E is the accumulation energy representing the accumulation cost of the pixel corresponding to the disparity candidate dc, O is the occlusion cost, and C is the matching cost of the corresponding matching point. After acquiring the path matrix FM, the stereo matching device 10 acquires the disparities Dn-D1 from the end pixel Pn, sequentially, according to the path matrix FM. Noticeably, the disparity Dn of the end pixel Pn is set to the predetermined value PV3, for enforcing the stereo matching device to sequentially determine the disparities Dn-1-D1 from the predetermined value PV3 according to the path matrix FM. Via designing the predetermined value PV3 (i.e. the disparity Dn) and the disparity candidate DCa appropriately, the disparity information of the fringe area in the current frame CF can be smoothed even when the fringe area of the left-eye image IL and the right-eye image of the current frame CF do not have corresponding matching parts.

Figure 3:
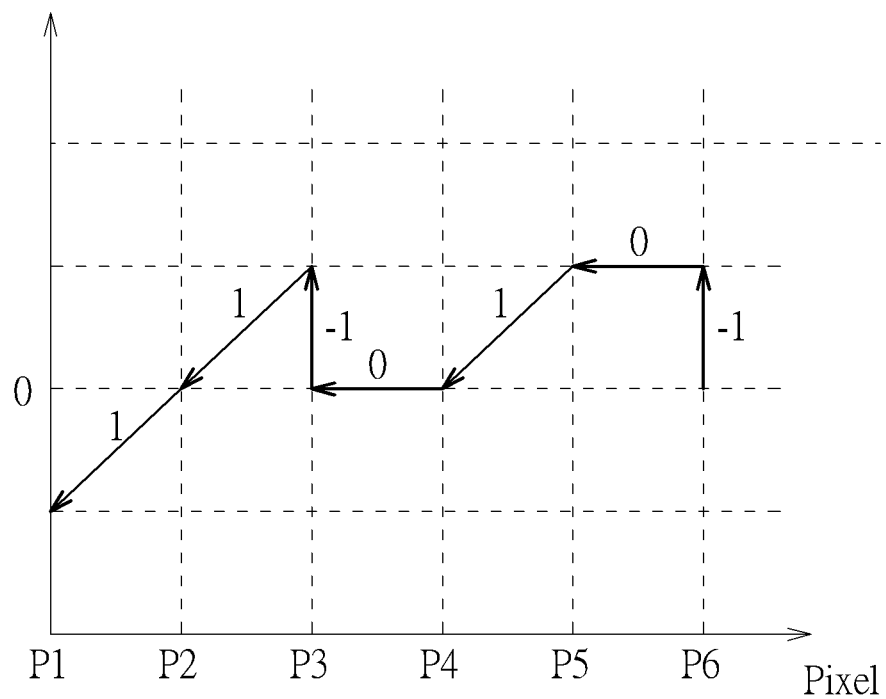
FIG. 3 is a characteristic plot between pixel and disparity according to an embodiment of the present invention.

For an example of the calculating procedures of the stereo matching device 10 acquiring the disparities D1-Dn according to the path matrix FM, please refer to FIG. 3, which is a characteristic plot between pixel and disparity according to an example of the present invention. As shown in FIG. 3, the stereo matching device 10 first sets the disparity D6 of the pixel P6 (corresponding to the end pixel Pn) to 0 (corresponding to the predetermined value PV3). Next, the stereo matching device 10 determines the disparities D5-D1 from 0 according to the values of the pixel P6 corresponding to 0 in the path matrix FM. As shown in FIG. 4, since the energy of the start pixel P1 corresponding to the disparity candidate DCa is set to the minimum energy (corresponding to the predetermined value PV1) among those of the start pixel P1 corresponding to all the disparity candidates, the disparity D1 of the start pixel P1 is the disparity candidate DCa. Besides, the differences between the disparities of the adjacent pixels do not exceed 1, so the fringe area of the current frame has smooth disparity information.

The disparity calculating method and the stereo matching device of the above embodiment enforcing the disparities of the start pixel and the end pixel to become the predetermined values via setting the energy of the start pixel and the disparity of the end pixel. Since the feature of the differences between the disparities between the adjacent pixels do not exceed 1, the disparity calculating method and the stereo matching device of the above embodiment makes the fringe area of the frame have smooth disparity information. According to different applications, those with ordinary skill in the art may observe appropriate alternations and modifications. For example, the predetermined values PV1 and PV3 can be the statistics (i.e. average, median) of the disparity information in a previous frame of the current frame, and are not limited herein.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the stereo matching device 10.

To sum up, the above example provides the disparity calculating method capable of smoothing the disparity information located at the fringe area of the frame and the stereo matching device thereof. Accordingly, the errors in the disparity information located the fringe area of the frame due to occlusion effect can be corrected. As a result, the user can have a wonderful user experience when watching 3-dimensional frames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A disparity calculating method for a stereo-matching device, used for calculating a plurality of disparities between a plurality of pixels of a first image-block and of a second image-block in a current frame, the disparity calculating method comprising:
   generating an energy matrix according to the first image-block and the second image-block, wherein the energy matrix comprises a plurality of energies of a plurality of pixels corresponding to a plurality of disparity candidates;
   setting the energy corresponding to a starting pixel of the plurality of pixels and a specified disparity candidate of the plurality of disparity candidates as a first predetermined value and setting the energies corresponding to the starting pixel and remaining disparity candidates of the plurality of disparity candidates as a second predetermined value, wherein the second predetermined value is greater than the first predetermined value;
   generating a path matrix according to the energy matrix; and
   determining the plurality of disparities of the plurality of pixels sequentially from an ending pixel of the plurality of pixels, wherein the disparity of the ending pixel is set as a third predetermined value.

2. The disparity calculating method of claim 1, wherein the first image-block and the second image block are scan lines locating at a same row in a first image and a second image of the current frame, respectively.

3. The disparity calculating method of claim 1, wherein the first disparity candidate is determined according to a plurality of disparities of a previous image.

4. The disparity calculating method of claim 3, wherein the first disparity candidate is an average of the plurality of disparities of the previous image.

5. The disparity calculating method of claim 3, wherein the first disparity candidate is a median of the plurality of disparities of the previous image.

6. The disparity calculating method of claim 1, wherein the third predetermined value is determined according to a plurality of disparities of a previous image.

7. The disparity calculating method of claim 6, wherein the third predetermined value is an average of the plurality of disparities of the previous image.

8. The disparity calculating method of claim 6, wherein the third predetermined value is a median of the plurality of disparities of the previous image.

9. A stereo matching device, comprising:
   means for generating an energy matrix according to a first image-block and a second image-block in a current frame, wherein the energy matrix comprises a plurality of energies of a plurality of pixels corresponding to a plurality of disparity candidates;
   means for setting the energy corresponding to a starting pixel of the plurality of pixels and a specified disparity candidate of the plurality of disparity candidates as a first predetermined value and setting the energies corresponding to the starting pixel and remaining disparity candidates of the plurality of disparity candidates as a second predetermined value, wherein the second predetermined value is greater than the first predetermined value;
   means for generating a path matrix according to the energy matrix; and
   means for determining a plurality of disparities of the plurality of pixels sequentially from an ending pixel of the plurality of pixels, wherein the disparity of the ending pixel is set as a third predetermined value.

10. The stereo matching device of claim 9, wherein the first image-block and the second image block are scan lines locating at a same row in a first image and a second image of the current frame, respectively.

11. The stereo matching device of claim 9, wherein the first disparity candidate is determined according to a plurality of disparities of a previous image.

12. The stereo matching device of claim 11, wherein the first disparity candidate is an average of the plurality of disparities of the previous image.

13. The stereo matching device of claim 11, wherein the first disparity candidate is a median of the plurality of disparities of the previous image.

14. The stereo matching device of claim 9, wherein the third predetermined value is determined according to a plurality of disparities of a previous image.

15. The stereo matching device of claim 14, wherein the third predetermined value is an average of the plurality of disparities of the previous image.

16. The stereo matching device of claim 14, wherein the third predetermined value is a median of the plurality of disparities of the previous image.

\* \* \* \* \*